Sept. 4, 1923.
A. M. DEMUTH
1,467,141
COOKING APPARATUS
Filed June 19, 1922
2 Sheets-Sheet 1
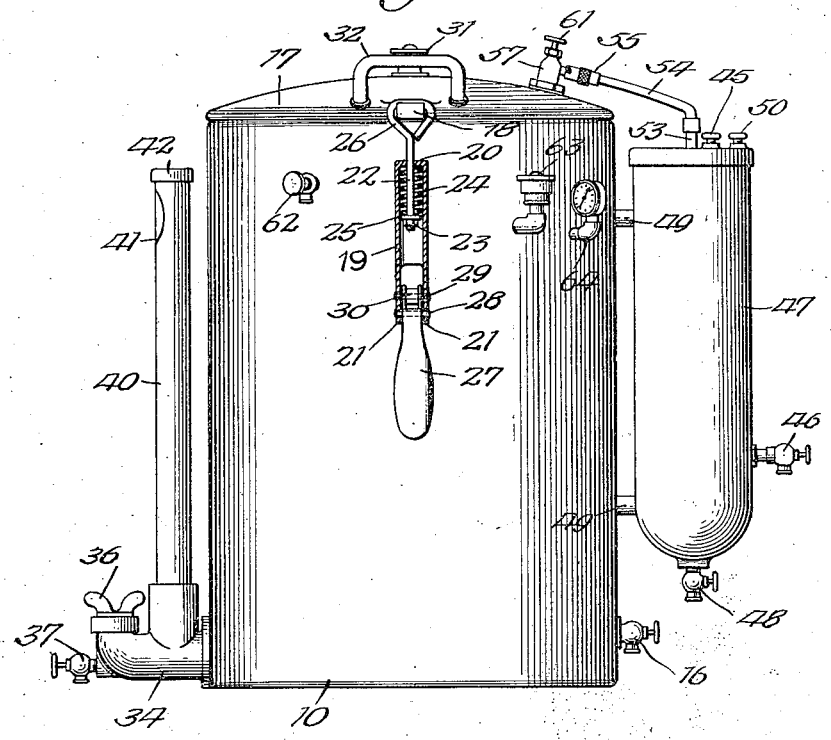
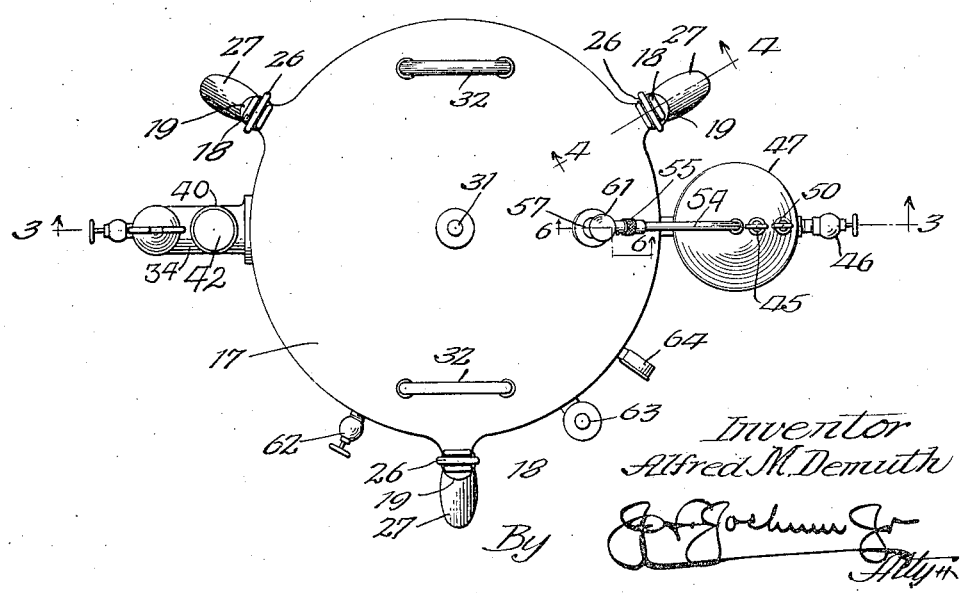
Inventor
Alfred M. Demuth Sept. 4, 1923.
A. M. DEMUTH
COOKING APPARATUS
Filed June 19, 1922
1,467,141
2 Sheets-Sheet 2
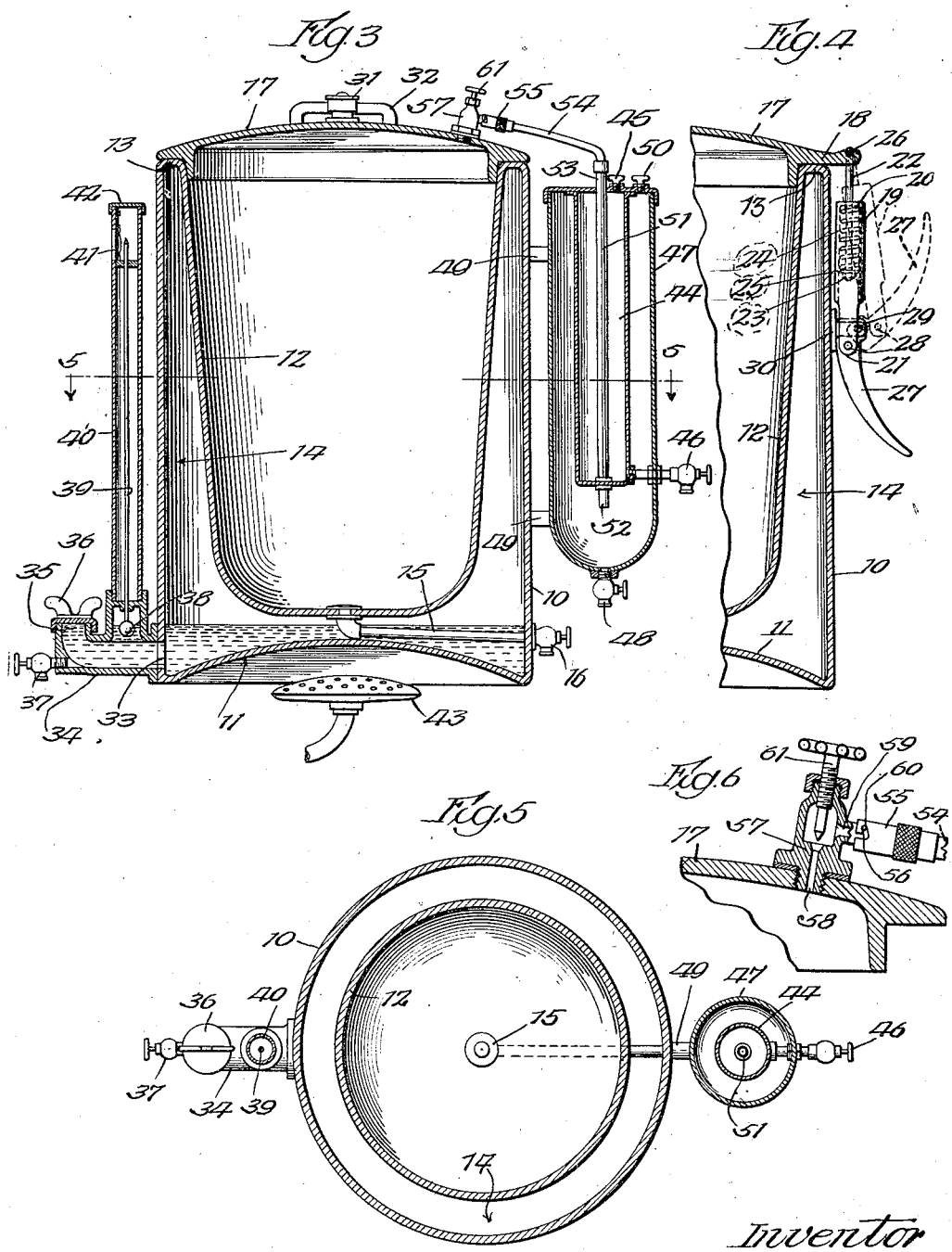

Patented Sept. 4, 1923.

1,467,141

UNITED STATES PATENT OFFICE.

ALFRED M. DEMUTH, OF CHICAGO, ILLINOIS.

COOKING APPARATUS.

Application filed June 19, 1922. Serial No. 569,391.

*To all whom it may concern:*

Be it known that I, ALFRED M. DEMUTH, a citizen of the United States, residing at Chicago, in the county of Cook and State of Illinois, have invented certain new and useful Improvements in Cooking Apparatus, of which the following is a specification.

In cooking apparatus of the type embodying a closed tank for containing a liquid which is to be converted into vapor, and a cooking chamber which extends into the tank out of contact with the walls thereof and out of communication with the interior of the tank, the quantity of liquid which is supplied to the tank has been such that a very moist steam is produced, with the result that it has been impossible to produce or give to the articles the "brown effect," which has been heretofore produced when roasting meats in the usual way in an ordinary oven.

With the apparatus heretofore constructed, it has been necessary to remove the article after cooking and place it in an oven for browning purposes.

To overcome these difficulties and objections and to provide an improved device of this character in which not only a very small quantity of liquid is supplied to the tank so as to produce a comparatively dry vapor for heating the cooking chamber, whereby the article of food will not only be sufficiently cooked but which will be also "browned" in a single operation and without the necessity of removing the article from the chamber, is one of the objects of the present invention.

A further object is to provide an improved device of this character embodying means whereby only a very small or limited quantity of liquid may be supplied to the tank, any excess quantity of liquid attempted to be supplied thereto, overflowing and being prevented from entering the tank.

With devices of this character which are commonly known as pressure cookers, that is cookers operating at pressures other than atmospheric, the cooking chamber is provided with a cover which is securely fastened in position during the cooking operation to hermetically seal the same to confine within the cooking chamber all of the vapor which is generated therein. This vapor contains some of the by products of the article, and a portion of the vapor is deposited upon the cover, with the result that after the cooking operation is completed and the cover removed, the vapor within the cooking chamber carrying the by products will rise out of the chamber and will be lost or wasted.

Furthermore the vapor deposited upon the under surface of the cover will be condensed and will flow or drip from the cover upon the floor or table.

It is another object of the present invention to not only prevent the vapors from being wasted when the cover is removed from the cooking chamber, but to provide improved means for conveying the vapors from the chamber before the cover is removed and then condensing the vapor to remove and conserve the by products therefrom.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention, and in which Figure 1 is a side elevation.

Figure 2 is a top view.

Figure 3 is a vertical longitudinal sectional view on line 3—3 Figure 2.

Figure 4 is a detail sectional view taken on line 4—4 Figure 2.

Figure 5 is a horizontal sectional view on line 5—5 Figure 3.

Figure 6 is a detail sectional view taken on line 6—6 Figure 2.

Referring more particularly to the drawings the numeral 10 designates a tank which may be of any desired size and configuration and constructed of any suitable material.

The bottom of the tank is concaved as at 11. Projecting into the tank through the top thereof is a cooking chamber 12 which is out of contact with the walls of the tank and is closed to communication with the interior of the tank, the top of the walls of the chamber being preferably connected as at 13 with the top of the wall of the tank so as to form a space 14 for vapor and which space encompasses the chamber.

Leading from the bottom of the chamber is a draw off pipe 15 which extends through the wall of the tank and is provided with a suitable valve or cock 16.

The chamber 12 is provided with a closure 17 preferably provided with a plurality of lugs 18 which extend beyond the wall of the tank.

Suitable fastening devices are provided for securing the cover in position. These fastenings devices preferably embody a tubular body portion 19 having a closed end 20 provided with an opening there through. The front end of the body portion is shaped to form spaced ears or lugs 21. Projecting through the opening through the closed end 20 of the body 19 is a member 22 preferably provided with a nut 23 on the end thereof within the body 19. An elastic member 24, preferably in the form of a coil spring encompasses a portion of the member 22 within the body 19, one end of the elastic member engaging the closed end 20 of the body and the other end engaging the nut or collar 23 or an interposed washer 25.

The other extremity of the member 22 which projects beyond the end 20 of the body 19 is shaped to form a loop 26 adapted to engage over the lug 18 on closure 17. An operating handle or lever 27 projects between the ears 21 on the body 19 and is pivotally connected intermediate its end as at 28 with the ears 21. One end of the handle or lever is pivotally connected as at 29 with a suitable anchor 30, which latter is secured to the outer wall of the tank 10.

In use, the lever 27 is moved into a position shown in dotted line in Figure 4, after which the loop 26 is engaged over the lug 18. The lever 27 is then swung about its pivot 29 into the full line position shown in Figure 4. This will cause the elastic member 24 to be placed under tension and will draw down upon the member 22 to lock the cover against removal, the locking being produced by passing the pivot 28 to one side of the pivot 29.

The free end of the lever 27 is preferably deflected outwardly so that the lever may be operated without necessitating the engagement of the operator's hand with the tank. One of these fastening devices is provided for each of the lugs 18 and any number of lugs may be provided.

The cover is provided with a safety valve 31 set for a predetermined pressure and the cover may be provided with suitable handles 32.

The tank 10 is provided with a fill opening 33 adjacent the bottom thereof. Connected with the fill opening is a fill pipe 34 an inlet end 35 of which points upwardly and terminates at a point slightly above the highest point of the concaved bottom 11 so as to maintain a very low liquid level in the tank 10, and by reason of this low liquid level or small quantity of liquid, the vapor generated in the tank will be comparatively dry and will encompass the chamber 12. With this construction of fill opening it will be manifest that liquid may be drawn into the tank until the level of the liquid reaches the opening 35 of the fill pipe 34 and any excess liquid which it is attempted to deliver to the tank will overflow the inlet opening and will be prevented from entering the tank. This is accomplished by reason of the low entrance of the fill opening and also for the reason that the liquid in the inlet passage and the tank are subjected to atmospheric pressure while the liquid is being initially supplied to the tank.

A suitable closure 36 is provided for the opening 35, and if desired the draw off or cock 37 may also be provided for removing the liquid from the tank.

Any suitable means may be provided for indicating the height of the liquid in the tank 10, during the cooking operation. To that end a float 38 having an indicator stem 39 is so arranged that the float will be controlled by the liquid. This indicator stem 39 preferably operates in a casing 40 arranged in a suitable position and the casing may be provided with a sight opening 41 and a closure 42 for the end of the casing.

A burner 43 is arranged beneath the bottom 11 of the tank 10. The bottom being concaved, the products of combustion from the burner will be confined adjacent the bottom of the tank.

During the cooking operation the vapor generated in the cooking chamber 12 will rise from the articles being cooked and will fill the chamber. When the cover or closure 17 is removed, the vapors within the chamber 12 and which vapors are laden with by products from the articles, would escape into the room not only to be lost or wasted but would be deposited upon the walls, windows, etc., eventually causing considerable damage.

It is one of the objects of this invention to not only conserve these vapors and by products but to prevent them from escaping into the room when the closure 17 is removed.

To obtain this result there is provided a condenser which embodies a chamber 44 adapted to receive a cooling medium through a suitable opening closed by the closure 45, the chamber being provided with a draw off or cock 46 adjacent its bottom.

This chamber 44 is encompassed by another closed chamber 47, the interior diameter of the chamber 47 being considerably greater than the external diameter of the chamber 44 to form a space between the chambers in which the vapor may circulate. The chamber 47 is preferably of a depth considerably greater than the chamber 44 and a draw off or cock 48 leads from the bottom of the chamber 47, chamber 47 being supported in any suitable manner preferably by means of brackets 49 connected with the tank 10 so as to produce a unitary construction. The chamber 47 may also be provided with an opening through the top thereof closed by suitable closure 50.

Extending through the chamber 44 is a condenser pipe 51 preferably of an external diameter considerably less than the internal diameter of the chamber 44. This pipe 51 passes through the bottom of the chamber 44 and terminate short of the bottom of the chamber 47 as at 52. The upper extremity 53 of the pipe 51 has communication with the interior of the chamber 12, preferably through the closure 17 so that the vapor within the chamber 12 will flow therefrom and into the pipe 51 to be condensed, the products of condensation being deposited in the chamber 47. Any vapor which is not condensed in its passage through the pipe 51 will be delivered into the chamber 47 and will rise therein so as to pass between the walls of the chambers 44—47 to encompass the former and will be condensed by contacting with the condensing surface formed by the wall of the chamber 44.

Any suitable means may be provided for establishing communication between the pipe 51 and the interior of the chamber 12. A suitable and efficient connection embodies a pipe 54 which is preferably flexible. One end of this pipe is connected with the end 53 of the pipe 51. To the other end of the pipe 54 is connected a coupling 55, preferably being provided with a bayonet slot 56 through the end thereof.

A valve casing 57 is carried by the closure 17 having communication such as 58 with the interior of the chamber 12 through the closure. The valve casing is provided with a discharge outlet opening 59 having pin 60 carried thereby and which pin is adapted to enter the bayonet slot 56 of the coupling 55 to detachably connect the end of the pipe 54 with the valve casing 57.

A valve 61 is provided for the valve casing 57 for controlling the opening 58 and thereby establishing or cutting off communication between the interior of the chamber 12 and the condensing pipe 51.

It will, therefore, be manifest that when the valve 61 is adjusted so as to cut off communication between the chamber 12 and the pipe 51, the vapors will be confined within the chamber 12. When the valve 61 is adjusted so as to open communication between the chamber 12 and the pipe 51, the vapors will pass from the chamber into the pipe 51 to be condensed therein and deposited in chamber 47 to be drawn therefrom through the draw off or cock 48.

It will also be manifest that this preservation and condensation of the vapors from the chamber 12 will conserve the by products which would otherwise pass off with the vapors when the closure 17 is removed, and would be lost.

After the vapors have passed from the chamber 12 the coupling 55 may be detached and the closure 17 removed at which time there will be no vapors in the chamber 12 that will escape therefrom and there will be no moisture or condensation upon the under face of the cover 17, which would otherwise drip or run off the closure on to the floor or table.

The tank 10 may be provided with an air vent 62, a safety valve 63, and a pressure gauge 64 all conveniently arranged.

While the preferred form of the invention has herein been shown and described it is to be understood that various changes may be made in the details of construction and in the combination and arrangement of the several parts, within the scope of the claims without departing from the spirit of this invention.

What is claimed as new is:

1. A cooking apparatus for articles of food embodying a closed tank for containing a liquid to be converted into vapor, a cooking chamber extending into the tank out of contact with the walls thereof and being closed to the interior of the tank, a closure for the chamber, and a supply opening for the tank adjacent the bottom thereof, the inlet of said opening being disposed to maintain a low liquid level in the tank and also operating to prevent the entrance into the tank of liquid beyond a predetermined quantity, the liquid in the tank and supply opening being subjected to atmospheric pressure while the liquid is being initially supplied to the tank.

2. A cooking apparatus for articles of food embodying a closed tank for containing a liquid to be converted into vapor, a cooking chamber extending into the tank out of contact with the walls thereof and being closed to the interior of the tank, a closure for the chamber, a supply opening for the tank adjacent the bottom thereof, the inlet of said opening being disposed to maintain a low liquid level in the tank and also operating to prevent the entrance into the tank of liquid beyond a predetermined quantity, the liquid in the tank and supply opening being subjected to atmospheric pressure while the liquid is being initially supplied to the tank and a closure for the said opening.

3. A cooking apparatus for articles of food embodying a closed tank for containing a liquid to be converted into vapor, a cooking chamber extending into the tank out of contact with the walls thereof and being closed to the interior of the tank, a closure for the cooking chamber, a supply opening for the tank adjacent the bottom thereof, the inlet of said opening being disposed to maintain a low liquid level in the tank and also operating to prevent the entrance into the tank of liquid beyond a predetermined quantity, the liquid in the tank and supply opening being subjected to atmospheric pressure while the liquid is being initially supplied to the tank, a closure for the said opening; and a visual indicator gage for determining the height of the liquid in the tank.

4. A cooking apparatus for articles of food, said apparatus operating at pressures other than atmospheric and embodying a cooking chamber, a closure for the chamber for hermetically sealing the chamber, a condenser exterior of the chamber, and means forming communication between the condenser and the interior of the chamber and through the said closure, the said communication embodying means for cutting off said communication.

5. A cooking apparatus for articles of food, said apparatus operating at pressures other than atmospheric and embodying a cooking chamber, a closure for the chamber for hermetically sealing the chamber, a condenser exterior of the chamber, and means forming communication between the condenser and the interior of the cooking chamber and through the said closure, the said communication embodying a detachable connection and a valve for closing and opening said communication at will.

6. A portable cooking apparatus for articles of food embodying as a unitary structure a cooking chamber operating at pressures other than atmospheric, a closure for hermetically sealing the chamber, a condenser exterior of the chamber, means embodying valve mechanism forming communication between the condenser and the interior of the chamber through the said closure, the said communication also embodying a detachable coupling, a second chamber into which the condenser discharges, and a draw off from the said second chamber.

7. A cooking apparatus for articles of food, said apparatus operating at pressures other than atmospheric and embodying a cooking chamber, a closure for the chamber for hermetically sealing the chamber, a condenser exterior of the chamber, and means detachably connecting the condenser with the interior of the chamber through the said closure, the said connection embodying valve mechanism, said condenser embodying a closed water chamber through which the condenser pipe passes, a chamber encompassing the water chamber and into which last recited chamber the said condenser pipe discharges, and a draw off for the last recited chamber.

8. A cooking chamber for articles of food embodying a closed tank for containing liquid adapted to be converted into vapor, a cooking chamber extending into the tank out of contact with the walls thereof and closed to the interior of the tank, the bottom of the tank being concaved, a closure for the chamber, and means whereby the liquid in the tank as it is initially supplied thereto will be subjected to atmospheric pressure whereby only a predetermined quantity of liquid may at any time be supplied to the tank, the said means also operating to insure a low liquid level in the tank.

9. A cooking chamber for articles of food embodying a closed tank for containing liquid adapted to be converted into vapor, a cooking chamber extending into the tank and out of contact with the walls thereof and closed to the interior of the tank, a closure for the chamber, the bottom of the tank being concaved, and a fill opening by means of which liquid may be supplied to the tank, the inlet of the said fill opening terminating at a point slightly above the highest point of the said concaved bottom and also operating to discharge from the tank the excess quantity of liquid beyond a predetermined amount, the liquid in the tank and fill opening being subjected to atmospheric pressure while the liquid is being initially supplied to the tank.

10. An apparatus for cooking articles of food, said apparatus operating at pressures other than atmospheric and embodying a cooking chamber, means forming a closure for the chamber, means for conveying away from the chamber the vapor generated in the chamber and for conserving and condensing the vapor, and means for controlling the last recited means at will.

11. An apparatus for cooking articles of food, said apparatus operating at pressures other than atmospheric and embodying a cooking chamber, means forming a closure for the chamber, means for conveying away from the chamber the vapor generated in the chamber and for conserving and condensing the vapor, and while the closure is in position to close the chamber, and means for controlling the last recited means at will.

In testimony whereof I have signed my name to this specification, on this 15th day of June, A. D. 1922.

ALFRED M. DEMUTH.